United States Patent [19]
Sikand et al.

[11] Patent Number: 5,515,421
[45] Date of Patent: May 7, 1996

[54] AUTOMATIC BATCH BROADCAST SYSTEM

[75] Inventors: Parminder S. Sikand, Richmond; Mary J. McAllister, San Anselmo, both of Calif.

[73] Assignee: Harris Corporation, Melbourne, Fla.

[21] Appl. No.: 311,977

[22] Filed: Sep. 26, 1994

Related U.S. Application Data

[63] Continuation of Ser. No. 243,054, May 16, 1994, abandoned, and Ser. No. 844,314, Mar. 2, 1992, abandoned.

[51] Int. Cl.$^6$ .............................. H04M 1/64; H04M 3/00
[52] U.S. Cl. .............................. 379/67; 379/265; 379/266; 379/309
[58] Field of Search ................................. 379/67, 88, 89, 379/84, 201, 205, 266, 309

[56] References Cited

U.S. PATENT DOCUMENTS

| | | | |
|---|---|---|---|
| 4,706,270 | 11/1987 | Astegiano et al. | 379/84 |
| 4,797,911 | 1/1989 | Szlam | 379/216 |
| 4,989,234 | 1/1991 | Schakowsky et al. | 379/84 |
| 5,159,626 | 10/1992 | Baum et al. | 379/266 |
| 5,278,898 | 1/1994 | Cambray et al. | 379/266 |
| 5,309,505 | 5/1994 | Szlam et al. | 379/88 |
| 5,311,574 | 5/1994 | Livanos | 379/88 |

Primary Examiner—Ahmad F. Matar
Assistant Examiner—Fan Tsang
Attorney, Agent, or Firm—Joel I. Rosenblatt

[57] ABSTRACT

A method and apparatus is shown for holding callers in a queue for the broadcast of a message. Callers are assembled by a common attribute such as a caller I.D. The callers are assembled in a queue according to this attribute and according to a suitable priority process. Once the callers are assembled into a set, the priority process has been completed, then all of the callers within the set are connected to receive the same broadcasted message.

25 Claims, 3 Drawing Sheets

AUTOMATIC BATCH BROADCAST SYSTEM

This application is a continuation of parent applications 08/243,054 filed May 16, 1994, now abandoned and 07/844,314 filed Mar. 2, 1992, now abandoned.

FIELD OF THE INVENTION

This invention relates to a computerized telephone system and particularly for an automatic batch broadcast system within those telephone systems for routing a single message to a number of incoming callers identified by a common characteristic.

BACKGROUND

Automatic telephone systems and Automatic call distribution systems are well known and for that reason are not described in detail. These telephone systems are found in U.S. Pat. No. 4,788,718 and U.S. Pat. No. 5,025,468 and the references cited therein. In the operation of these automatic telephone systems and automatic call distribution systems, the callers are placed on hold and then, in the case of the ACD System, are connected to the next available agent according to a priority system. Within this system, is employed the concept of a queue. The amount of time that the caller or a number of callers may be placed in the queue and on hold depends upon the priority system and the values contained within the priority systems structure. ACD Systems, according to their function, hold callers in the queue and then connect callers to agents for interaction communication.

According to ACD function a single agent is reserved for, and connected to, each individual caller. What such an ACD scheme does not have is the capability of collecting a number of callers by a common identifying parameter and broadcasting a message to the collected callers. Additionally, the ACD system requires an agent be provided. Provisions are not made in the ACD scheme for providing an appropriate message for each such identified group of callers. Additionally, separate connections are required to be made in the ACD scheme to each, one for each separate agent. Provisions are not made for providing a single message source and for connecting that message source to a multiple groups of assembled callers either singularly in time or simultaneously through a multiplex scheme.

SUMMARY OF THE INVENTION

This invention improves automatic telephone systems and automatic call distribution systems. In particular, the invention is directed to automatic call distribution systems where callers are identified according to a one or more common defined characteristics and a message is selected responsive to that caller interest and broadcast. According to the principles of the invention and the preferred embodiment shown, the message may be broadcasted to an assembled group of callers having the same interest identified in that broadcasted message. Additionally, a single server may provide multiple broadcast messages reducing the number of message stored and reproduction equipment.

In the preferred embodiment, the common characteristic is generally referred to as a broadcast identification. This broadcast identification may identify callers by their identified area code, time of call, telephone number of call, or any combination of these or any other caller characteristics or by the use separate codes entered by the caller and connection is made. For example, the broadcast message may be the local weather for a particular district. In this case the caller I.D. would be the zip code being geographically referenced to that district.

According to the principles of the invention, callers are collected in a queue according to this caller identification. In the example given, for the preferred embodiment it is an area code. In the event there is no queue having callers identified for a particular area code, a queue is established. Additionally, a timer is started for the queue although it should be understood that other systems of prioritizing the caller queue announcement time or broadcast time may be used, the invention not being restricted to a timer. As additional callers from that same area code call, callers are added to the queue. Further, as callers terminate, callers are removed from the queue. At the expiration of the queue timer, all of the callers are connected to the broadcasting device containing the message, one way simplex communication is used.

The broadcasting device may contain messages stored digitally or in analog fashion. The messages may be provided to one or more queues by providing multiplex communication as is well known in the art. Additionally, the characteristic identifying the callers in the queue may be communicated to the broadcasting device by means of DTMF tones, or any other series of electrical signals sufficient to operate the announcement mechanism to generate the correct announcement for the respective queue. This technique is well known in the art and is not explained in detailed here.

The announcement device then connected to all of the callers in the queue broadcast the announcement and upon termination, the callers are disconnected.

DETAILED DESCRIPTION OF THE INVENTION

Figure 1:
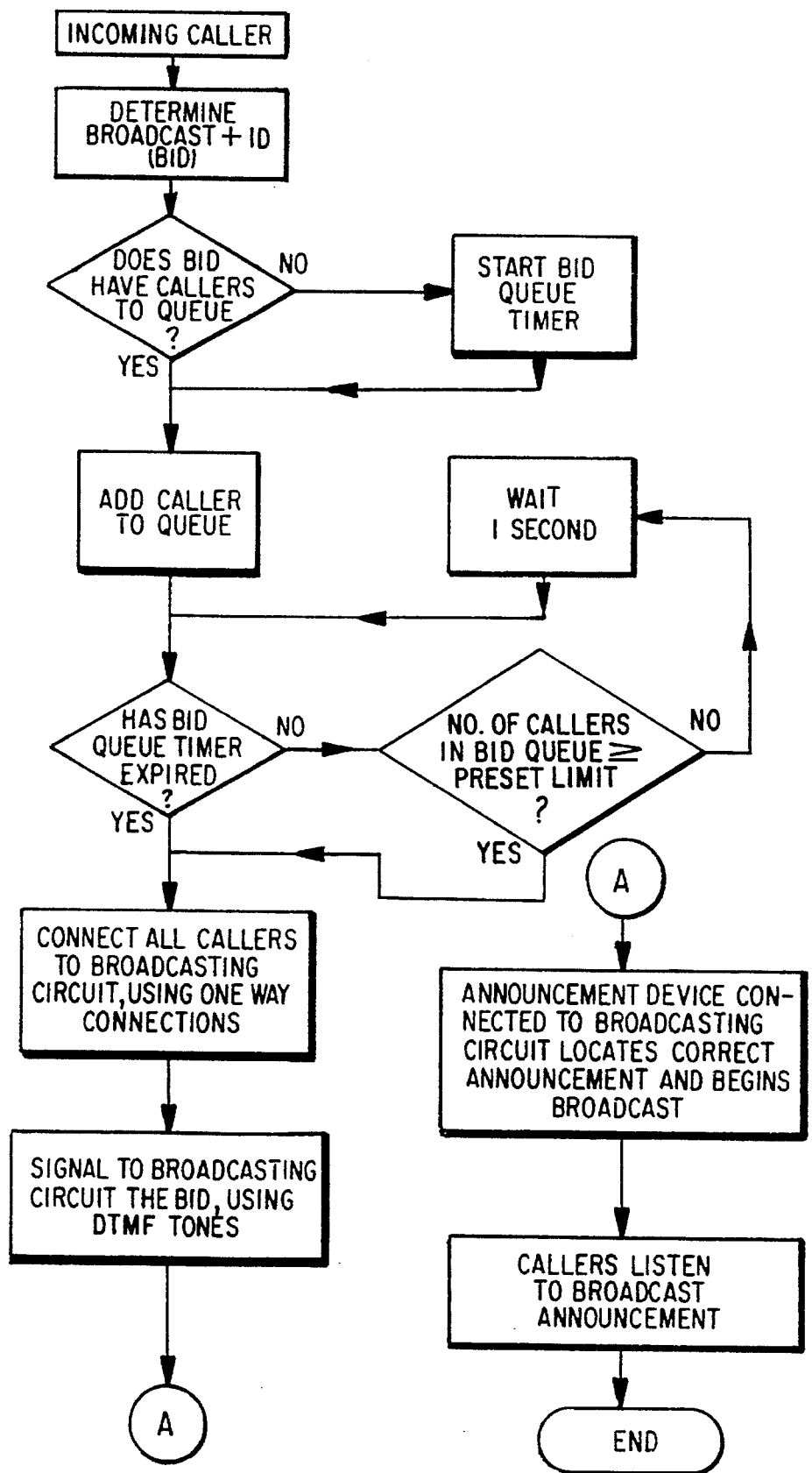
FIG. 1 shows a flow chart describing the operation of the preferred embodiment, as claimed.
Figure 2:
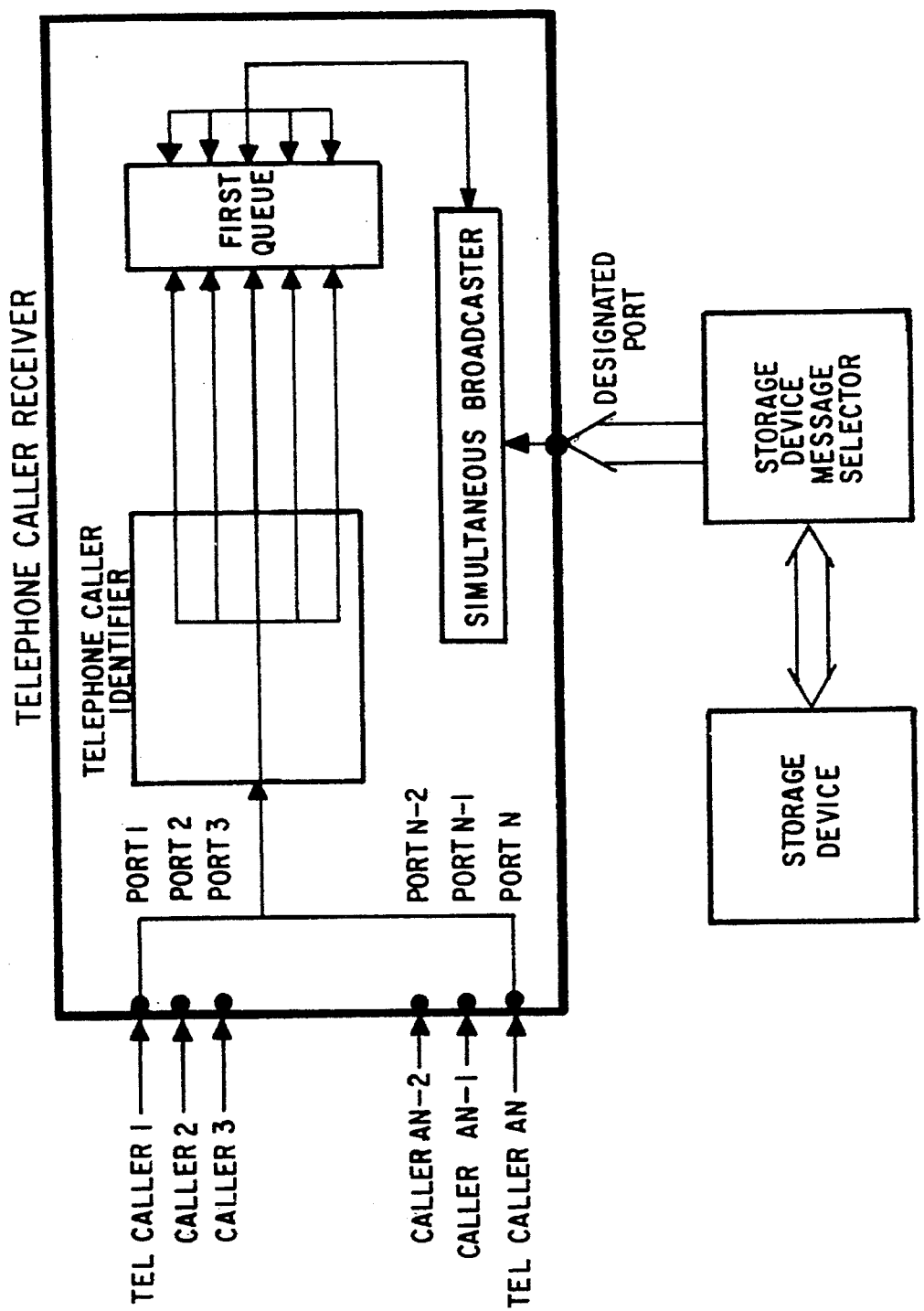
FIG. 2 shows a block diagram of the system according to the preferred embodiment, as claimed.
Figure 3:
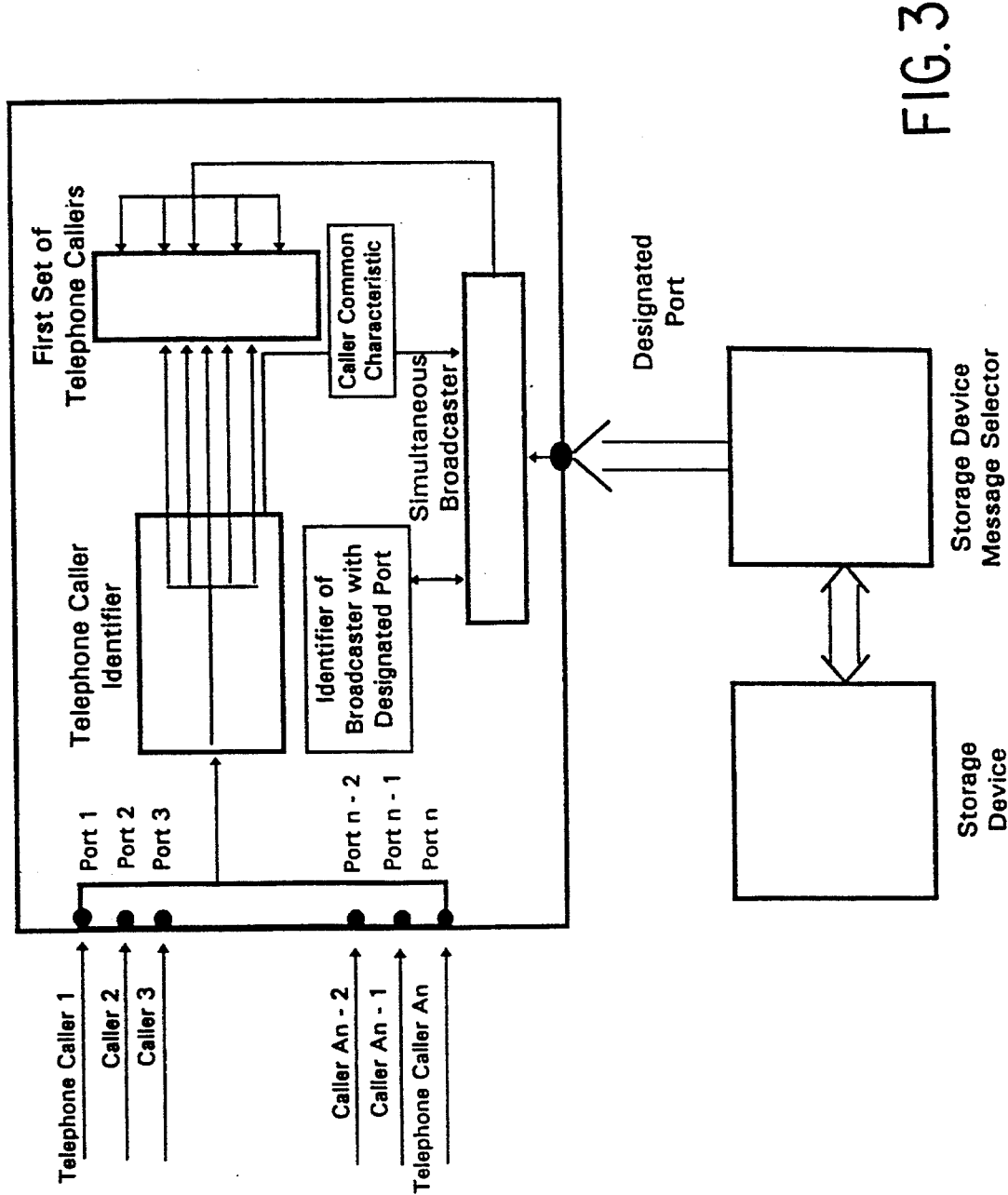
FIG. 3 shows a block diagram of a variation of the system of the preferred embodiment, as claimed.

The invention according to the preferred embodiment is used in a decentralized image responsive telephone time slot interchange system as shown in U.S. Pat. No. 4,688,212. However, it should be understood that the invention may be practiced with any of the telephone systems where multiple input calls may be collected and then a single message may be broadcast to the group of assembled callers.

The telephone exchange is shown in the above referenced patent, as a time scan multiplexing system using the process of time scan and a number of ports, such as example trunk ports, through which an incoming call may be connected. Central processes are then used to process the information received from the trunk port to connect the trunk to an addressed destination port (also called an extension port) to complete the call. In the process, the transmission of information between the trunk port and the address port (containing the extension) is accomplished on a time multiplex schedule controlled from the centrally located processor.

In the preferred embodiment, calls received through a trunk port contain a caller identification as this is well known in the art. This caller identification is then used as logical attribute to place the caller within a queue, responsive to that identification. In the case of the preferred embodiment where the message to be broadcast is local weather for the day, the caller identification of interest would be the caller's zip code. Where there is no queue for that defined group of callers, a caller queue is started.

Various techniques may be used for assembling this caller queue, the exact technique used being capable of selection from any available technique known in the art and not being essential to the inventive principle. For example, the trunk port or source port for the call may be identified in a look-up table classified by an attribute such as the caller broadcast I.D. queue.

Additionally, when the broadcast I.D. queue is started, a timer is started measuring the amount of time since the first caller has been put in that queue. It would be clear to those skilled in the art, other priority schemes could be used such as a number of callers in the queue or the times since the last broadcast was made for that group of identified callers. Such priority is not essential to the invention and for that reason not being discussed in detail.

Continuing, according to the principles of the invention and the preferred embodiment, where the timer for the queue has expired, all of the callers are connected to a single broadcasting device containing the message of interest. The broadcast may be made simultaneously or a multiplex fashion to all of the callers for example identified in the look-up table for that broadcast identification.

According to the principles of the invention and the preferred embodiment, the broadcasting device is operated by DTMF tones generated within the telephone interchange system. However, it should be understood any other type of digital or analog signaling system could be used.

The proper announcement is then sorted from the single broadcast device and transmitted to the callers in the broadcast identified queue. Additionally, several queues may receive broadcast at the same time by use of multiplex transmissions, the broadcasting scheme accessing and multiplexing the transmission to each individual broadcast I.D. group.

Upon completion of the broadcast, the group of calls receiving the broadcast would be disconnected.

The flow chart shown in the figure describes the process for correctly identifying the incoming call going to a chosen attribute, classifying that call and a queue, and then holding that call until the correct time, according to preset priority when a message is broadcast to that caller and all of the callers held on a queue.

As shown, the Callers I.D. (CID) is received with the incoming call. Responsive to that CID, a determination whether a queue has been started for that CID, the caller is then added into the, queue. This may be by any of the well known techniques and those skilled in the art. Accordingly, this is not described. Where the caller is the first to be placed in the queue, the priority process is initiated. In the case of the preferred embodiment, the priority processing is by a timer and the queue timer is started.

As new calls come into the system, they are added to an existing queue for their respective CID or a new queue started. Upon the termination of the priority process, in this case the time out of the queue timer, the queue called by that timer and all of the callers in that queue are accessed. As shown in the figure, processing according to the expiration of the priority scheme may be continuance with a delay such as a one second delay as shown in the figure. In the case of the preferred embodiment, the queue timer for any one queue with respect to a particular or designated CID is queried at one second intervals.

Upon the expiration of the priority limits, in this case the time out of the queue timer, the system connects all callers to the broadcasting message. In the preferred embodiment, the port containing the message is accessed by DTMF tones. Where as in the preferred embodiment that port is connected to a plurality of discrete messages for each respective CID, the particular message for that queued CID message is identified. This may be by or with reference to the CID for the queue. As this would be well known in the art it is not described in detail.

The single broadcasted message for the respective queue is then made. This may be accomplished in the time multiplex switch, of the preferred embodiment, a multiplex connection from the broadcasting port to each of the connected trunk lines. As soon as the announcement has been completed, the callers are disconnected.

At the same time, the same port may contain more than one message which may be broadcast to other queues containing the CIDs by time scan multiplexing. As this is well known in the art it is not described.

The processor used in the preferred embodiment is a 20—20 TDMF switch It is manufactured by Harris Corporation Digital Telephone System Division. It uses an Intel 286 processor. The program is written in Intel PL/M.

We claim:

1. A method of using an automated telephone switch, having ports to receive telephone calls containing telephone caller identification data, to identify callers having common caller identification data, and to place the identified callers into a queue for simultaneously receiving a broadcast message from a storage device connected to a designated port of said automated telephone switch, comprising the steps of:

receiving telephone calls containing telephone caller identification data;

responsive to said telephone caller identification data, identifying telephone callers having a first common identifying characteristic;

arranging said telephone callers having said first common identifying characteristic in a first queue of said telephone callers having said first common identifying characteristic;

connecting said first queue to a designated port of said storage device, to hear a first stored message selected in response to said first common identifying characteristic; and simultaneously broadcasting said first stored message selected in response to said first common identifying characteristic to said telephone callers in said first queue having said first common identifying characteristic.

2. The method of claim 1, including the steps of:

storing a plurality of messages in said storage device.

3. The method of claim 2, including the step of selecting said first stored message from said plurality of messages.

4. The method of claim 1, wherein said steps of connecting said first queue to said storage device, to hear said first stored message and simultaneously broadcasting said first stored message to said first queue, includes the steps of:

counting the time duration of said first queue; and responsive to said step of counting the time duration of said queue, connecting said first queue to said storage device to hear said first stored message.

5. The method of claim 4, wherein said step of counting the time duration of said queue includes the step of counting a pre-determined time duration of said queue.

6. The method of claim 1, including the steps of:

identifying the ports in said automated telephone switch for receiving telephone calls;

identifying a first set of ports in said automated telephone switch, receiving telephone calls from telephone callers in said first queue;

identifying a designated port of said automated telephone switch connected to said storage device; and connecting said first queue through said first set of ports of said automated telephone switch, to hear said first message from said storage device, through said designated port of said automated telephone switch.

7. The method of claim 1, including the steps of:

responsive to said telephone caller identification data, identifying telephone callers having a second common identifying characteristic;

arranging said telephone callers having said second common identifying characteristic in a second queue;

connecting said second queue to said storage device, to hear a second stored message; and simultaneously broadcasting said second stored message to said second queue.

8. The method of claim 7, including the step of:

using said telephone switch to select said second stored message from said plurality of messages, in response to said telephone caller identifying data.

9. The method of claim 8, including the steps of:

identifying a second set of ports in said automated telephone switch, receiving telephone calls from telephone callers in a second queue; and connecting said second queue through said second set of ports of said automated telephone switch, to hear a second message from said storage device, through said designated port of said automated telephone switch.

10. In a telephone switch having identified ports for receiving and transmitting messages with caller identifying information, from and to calling parties, the method of connecting a set of telephone callers, at a first set of ports in said telephone switch, and identified by identifying characteristics, to a stored message connected to a designated port in said telephone switch, including the steps of:

A. receiving calls from calling parties, at first set of ports of said telephone switch, said calls identified by identifying characteristics;

B. using caller identifying information to identify a first plurality of telephone callers, at a first set of ports of said telephone switch, having a first common identifying characteristic and placing said first set of ports in a first queue of said telephone callers having said first common identifying characteristic;

C. identifying a designated port of said telephone switch connected to a broadcast device having a plurality of stored messages;

D. selecting a first stored message from said broadcast device, responsive to said first common identifying characteristic; and E. connecting said designated port of said telephone switch and said first set of ports of said telephone switch and simultaneously broadcasting said first stored message to said callers in said first queue through said first set of ports.

11. The method of claim 10 including the steps of:

using said caller identifying information to identify a second plurality of said callers, at a second set of ports of said telephone switch having a second common identifying characteristic and placing said second set of ports in a second queue;

A. selecting a second stored message from said broadcast device, responsive to said second common identifying characteristic; and B. connecting said designated port of said telephone switch and said second set of ports of said telephone switch and simultaneously broadcasting said second stored message to said second queue through said second set of ports and through said designated port.

12. A system for connecting a set of telephone callers, identified by a common characteristic, to a stored message, comprising:

A. means for receiving telephone calls with telephone caller identifying information;

B. means for using said telephone caller identifying information to identify said telephone callers by a first common characteristic and for arranging said telephone callers having said first common characteristic in a first queue;

C. means for selecting a first stored message from a storage device, responsive to said first common characteristic; and D. means for simultaneously broadcasting said first stored message to said telephone callers in said first queue.

13. The system of claim 12 including means for storing a plurality of messages on said storage device.

14. The system claim 13 including means for selecting said first stored message from said plurality of messages, responsive to said first common characteristic.

15. The system of claim 12 including:

means for signaling the expiration of a period of time; and means for connecting said telephone callers in said first queue to said first stored message after the expiration of said period of time.

16. The system of claim 12 including:

means for holding said telephone callers in said first queue for a predetermined period of time.

17. The system of claim 12 including:

ports for receiving said calls at a telephone switch;

means for identifying said calls with a first set of ports of said telephone switch, with said telephone callers in said first queue;

means for identifying said storage device with a designated port of said telephone switch; and means for connecting said first set of ports to said designated port.

18. The system of claim 13 including:

means for using said telephone caller identifying information to identify said telephone callers by a second common characteristic and for arranging said telephone callers by said second common characteristic in a second queue;

means for selecting a second stored message from said storage device responsive to said second characteristic; and means for simultaneously broadcasting said second stored message to said second queue.

19. The system of claim 18 including;

means for selecting said second stored message from said plurality of messages.

20. The system of claim 17 including:

means for identifying a second set of ports of said telephone switch with said telephone callers in said second queue; and means for connecting said designated port to said second set of ports.

21. In a telephone switch having ports for receiving and transmitting messages from and to calling parties, a system for connecting a set of telephone callers identified by a common characteristic to a stored message, including:

means for receiving calls with identifying information from said calling parties, at said ports of said telephone switch;

means for using said identifying information to identify a plurality of said telephone callers having a first common characteristic, in a first set of telephone callers;

means for identifying a single broadcast device having a plurality of stored messages with a designated port of said telephone switch;

means for selecting a first stored message from said single broadcast device, responsive to said first common characteristics; and means for simultaneously broadcasting said first stored message to said first set of telephone callers through said designated port.

22. The system of claim 21 including:

means for using said identifying information to identify a plurality of said callers having a second common characteristic, in a second set of telephone callers;

means for selecting a second stored message responsive to said second common characteristics; and means for simultaneously broadcasting said second stored message to said second set of telephone callers through said designated port.

23. A method of using an automated telephone switch, having ports to receive telephone calls containing telephone caller identification data, to identify callers having common caller identification data, and to place the identified callers into a queue for simultaneously receiving a broadcast message from a storage device connected to a designated port of said automated telephone switch, comprising the steps of:

receiving telephone calls containing telephone caller identification data;

responsive to said telephone caller identification data, identifying telephone callers having a first common identifying characteristic;

arranging said telephone callers having said first common identifying characteristic in a first queue limited to said telephone callers having said first common characteristic;

connecting said first queue to a designated port of said automated telephone switch and through said designated port to said storage device, to hear a first stored message selected in response to said first common identifying characteristic; and simultaneously broadcasting said first stored message selected in response to said first common identifying characteristic to said callers in said first queue limited to said telephone callers having said first common characteristic.

24. The method of claim 23, wherein said steps of connecting said first queue to said storage device, to hear said first stored message and simultaneously broadcasting said first stored message to said first queue, includes the steps of:

counting the time duration of said first queue; and responsive to said step of counting the time duration of said queue, connecting said first queue to said storage device through said designated port to hear said first stored message.

25. The method of claim 23, wherein said step of counting the time duration of said queue includes the step of counting a pre-determined time duration of said queue.

* * * * *